United States Patent
Hasegawa et al.

(10) Patent No.: US 6,579,644 B2
(45) Date of Patent: Jun. 17, 2003

(54) CONNECTING STRUCTURE FOR BATTERY TERMINALS

(75) Inventors: Tetsuya Hasegawa, Shizuoka (JP); Yasuhiro Tamai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 128 days.

(21) Appl. No.: 09/867,597

(22) Filed: May 31, 2001

(65) Prior Publication Data

US 2001/0049053 A1 Dec. 6, 2001

(30) Foreign Application Priority Data

May 31, 2000 (JP) ........................................ 2000-163211

(51) Int. Cl.[7] .............................................. H01M 2/02
(52) U.S. Cl. ........................... 429/178; 429/1; 429/181; 439/677
(58) Field of Search ............................. 439/677; 429/1, 429/178, 181

(56) References Cited

U.S. PATENT DOCUMENTS 4,693,948 A * 9/1987 McEwan .................... 429/121
6,428,363 B2 * 8/2002 Tamai et al. ................ 439/677

FOREIGN PATENT DOCUMENTS

| DE | 197 19 919 A1 | 11/1998 | ............ H02H/3/18 |
| JP | 4-220947 | 8/1992 | ............ H01M/2/30 |
| JP | 2000-30689 | * 1/2000 | ............ H01M/2/30 |

OTHER PUBLICATIONS

Patent Abstracts of Japan. 04–220947. Aug. 11, 1992.
English language Abstract. DE19719919A1. Nov. 26, 1998.

* cited by examiner

*Primary Examiner*—Carol Chaney
*Assistant Examiner*—Dah-Wei D. Yuan
(74) *Attorney, Agent, or Firm*—Sughrue Mion, PLLC

(57) ABSTRACT

A battery body (27) has positive and negative battery electrodes (29, 30), which are provided in two accommodation spaces (32, 33) surrounded by an insulating wall portion (27a) that is an outer wall thereof, and also has terminal insertion openings (32a, 33a) adapted to permit only battery terminals, which correspond to the battery electrodes (29, 30) accommodated in the accommodation spaces (32, 33), respectively, to be fitted thereto. Each of the battery terminals (24, 25) has a connecting flat plate portion (24a, 25a) that has a transversal section of a predetermined shape and can be fitted into a corresponding one of the terminal insertion opening (32a, 33a). One of the terminal insertion openings (32a) has a nearly rectangular opening having an opening width (a1), which is wider than an opening width (c1) of the other terminal insertion opening (33a), and also having an opening height (b1), which is lower than an opening height (d1) of the latter terminal insertion opening (33a).

5 Claims, 4 Drawing Sheets

PRIOR ART

CONNECTING STRUCTURE FOR BATTERY TERMINALS

BACKGROUND OF THE INVENTION

1. Technical Field of the Invention

The present invention generally relates to a connecting structure for battery terminals and, more particularly, to a connecting structure for surely connecting battery terminals to battery electrodes of corresponding polarity of a battery body mounted on a vehicle without miscontact of the battery terminals with the battery electrode.

2. Related Art

FIGS. 5 and 6 illustrate a related connecting structure for fastening and fixing battery terminals, provided at an end of an electric wire connected to various kinds of electrical equipment, to battery electrodes of a battery body, mounted on a vehicle, by screw members.

This connecting structure for a battery terminal is disclosed in JP-A-4-220947, and configured so that a positive battery electrode 3 and a negative battery electrode 4 of the vehicle-mounted battery body 1 are quadrangular-prism-like posts 3b and 4b respectively erected on base potions 3a and 4a on the top surface of the battery body 1.

Each of the posts 3b and 4b has a flat abutting surface 6 or 7 formed at the tip thereof. In each of abutting surface portions 6 and 7, a screw hole 8 or 9 for securing a battery terminal 11 or 12 (to be described later) by screws is formed. These screw holes 8 and 9 are provided so that the central axes thereof are eccentric from the central portions of the abutting surfaces in different directions in such a way as to make the position of the central axis of the positive electrode with respect to the center of the corresponding screw hole differ from that of the central axis of the negative electrode with respect to the center of the other screw hole.

Each of the battery terminals 11 and 12 includes: a flat plate portion 11a or 12a adapted to abut against a corresponding one of abutting surfaces 6 or 7 respectively formed at the tips of the posts 3b and 4b; an abutting wall portion 11b or 12b which is erected on an edge portion of a corresponding one of these flat plate portions 11a and 12a and abuts against an adjacent side surface of the corresponding post 3b or 4b; and a wire cramping portion 11a or 12c to which a corresponding electric wire 16 or 17 is press-attached.

Further, in each of the flat plate portions 11a and 12a, a screw insertion hole 14 or 15 is provided at an eccentric position corresponding to a corresponding one of the screw holes 8 and 9 respectively formed in the posts 3b and 4b to be connected thereto.

In the aforementioned connecting structure for the battery terminals, the flat plate portions 11a and 12a of the battery terminals 11 and 12 are set on the abutting surfaces 6 and 7 of the posts 3b and 4b so that the screw insertion holes 14 and 15 are aligned with the screw holes 8 and 9 of the posts 3b and 4b. Thus, each of the abutting wall portions 11b and 12b is caught on the corner portion of a corresponding one of the posts 3b and 4b. Consequently, the flat plate portions 11a and 12a serve as rotation inhibiting means.

Therefore, when fastened by bolts 19 screwed into the screw holes 8 and 9, the battery terminals 11 and 12 are restrained from rotating with respect to the posts 3b and 4b. This prevents a direction, in which the wire is drawn, from being changed.

Furthermore, as mentioned previously, the position, at which the screw hole 14 is formed, in the battery terminal 11 corresponding to one of the positive and negative battery electrodes is made to differ from the position, at which the screw hole 15 is formed, in the battery terminal 12 corresponding to the other battery electrode. This prevents each of the battery terminals from being misconnected to the battery electrode of the opposite polarity.

However, although the aforementioned related connecting structure for the battery terminals can prevent each of the battery terminals from being misconnected to the battery electrode of the different polarity, each of the battery electrodes 3 and 4 are exposed to the outside, so that the miscontact of each of the battery terminals 11 and 12 with the battery electrode of the opposite polarity may occur. Thus, there is a fear that electric backflow caused by the miscontact may break the equipment.

Especially, in recent years, there has been a tendency to enhance the efficiency of a vehicle power supply by increasing the voltage thereof. Thus, it is studied to replace 12-volt batteries and 24-volt batteries, which are currently in wide use, with 36-volt batteries. However, the implementation of a high-voltage battery increases the degree of seriousness of the problems of accidents due to the miscontact and sparks due to an arc.

Furthermore, recent increase in the power consumption of per vehicle results in increase in the number of batteries mounted on a vehicle. Thus, there is the need for contrivances to prevent occurrences of a misconnection and a miscontact of battery terminals with a plurality of batteries.

SUMMARY OF THE INVENTION

Accordingly, an object of the invention is to solve the problems, and to provide a connecting structure for reliably connecting each of battery terminals with a corresponding one of battery electrodes of a vehicle body without causing the miscontact of the battery terminals with the battery electrodes.

To achieve the foregoing object of the invention, according to the invention, there is provided a connecting structure for battery terminals, which is adapted to fasten and fix each of positive and negative battery terminals, which are respectively connected to end portions of wires, to one of battery electrodes, which is of corresponding polarity, of a battery body by screw members. In this structure, the battery body has positive and negative battery electrodes, which are provided in a plurality of accommodation spaces surrounded by an outer wall thereof, and also has terminal insertion openings each having a predetermined shape permitting only the battery terminals, which correspond to the battery electrodes in the accommodation spaces, to be fitted thereinto. Further, each of the battery terminals has a connecting flat plate portion having a transversal section of a predetermined shape, which is enabled to be fitted into a corresponding one of the terminal insertion openings. Furthermore, one of the terminal insertion openings has an opening width, which is wider than an opening width of the other terminal insertion opening, and also has an opening height that is higher than an opening height of the other terminal insertion opening.

With the aforementioned configuration, the electrical connection between the positive and negative battery terminals, which are connected to end portions of wires, and the battery electrodes is established by fastening and fixing each of the connecting flat plate portions, which is fitted into a corresponding one of the accommodation spaces from a corresponding one of the terminal insertion openings provided in the outer wall of the battery body, to the battery electrode of corresponding polarity by screw members.

Even when the battery terminal is misfitted into the terminal insertion opening corresponding to polarity, which does not correspond to this battery terminal, at that time, this battery terminal interferes with the opening edge of the terminal insertion opening because of the difference between the shape of the transversal section of the connecting flat plate portion and that of the terminal insertion opening. Consequently, this battery terminal cannot be fitted into this terminal insertion opening. Moreover, even the contact between this battery terminal and the battery electrode provided in the accommodation space, which is surrounded by the insulating wall portion, cannot be achieved.

Therefore, the misconnection is known without the contact between the battery terminal and the battery electrode, which do not correspond to each other, and the connection therebetween.

Further, because the battery electrodes are provided in the accommodation spaces surrounded by the insulating wall portions of the outer wall, arc caused at a moment, at which the battery terminal is in contact with the battery electrode, occurs in the accommodation space. Thus, sparks due to the arc do not go out of the battery body.

Further, preferably, a temporary latch mechanism for temporarily latching each of the battery terminals at a fastening/fixing position in a corresponding one of the accommodation spaces is provided between a corresponding one of the battery terminals to be fitted thereinto and an inner wall of each of the accommodation spaces.

Thus, when the battery terminal is fastened and fixed to the battery electrode of the battery body, the battery terminal is temporarily latched at the battery electrode by inserting this battery terminal into the accommodation space corresponding to an appropriate one of the battery electrodes to be connected thereto.

This prevents one hand of a worker from being used for supporting the battery terminal during an operation of fastening the battery terminal by the screw members, one hand of a worker is used for supporting the battery terminal. Consequently, the worker can easily perform the screwing operation by freely using both hands.

Furthermore, preferably, a circumferential portion of each of the terminal insertion openings is formed from an insulating member, whose abrasion resistance is higher than abrasion resistance of an insulating material of the outer wall.

This prevents the circumferential portion, which is rubbed when the battery terminal is inserted into or detached from the accommodation space, of each of the terminal insertion openings from wearing down and eroding during the attachment/detachment of the battery terminal. Additionally, this prevents the terminal insertion openings from being deformed.

DETAILED DESCRIPTION OF PREFERRED EMBODIMENT

Hereinafter, a connecting structure for battery terminals, which is an embodiment of the invention, is described in detail with reference to the accompanying drawings.

Figure 1:
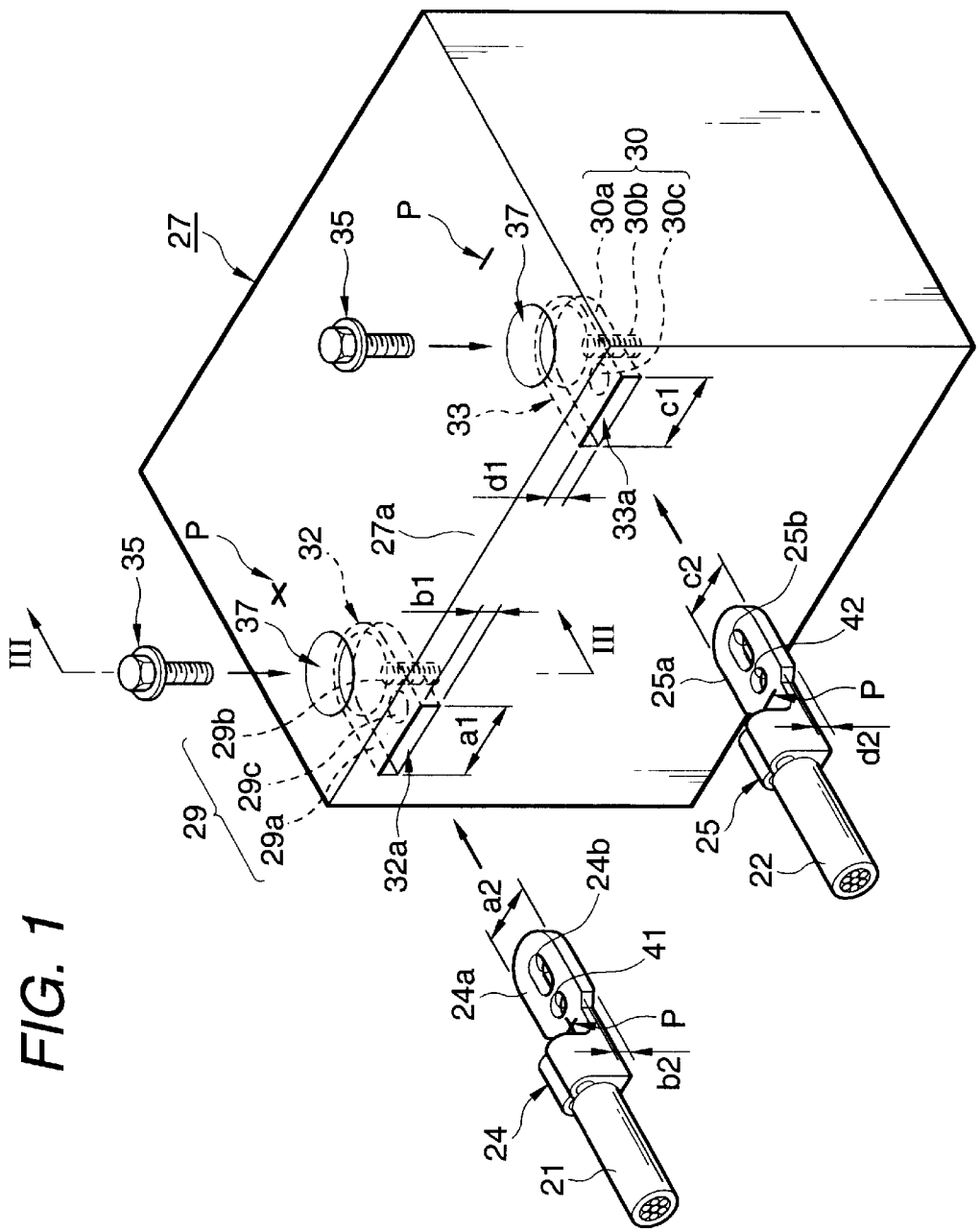
FIG. 1 is a perspective view illustrating the entire battery body having a connecting structure for a battery terminal according to a first embodiment of the invention.
Figure 2:
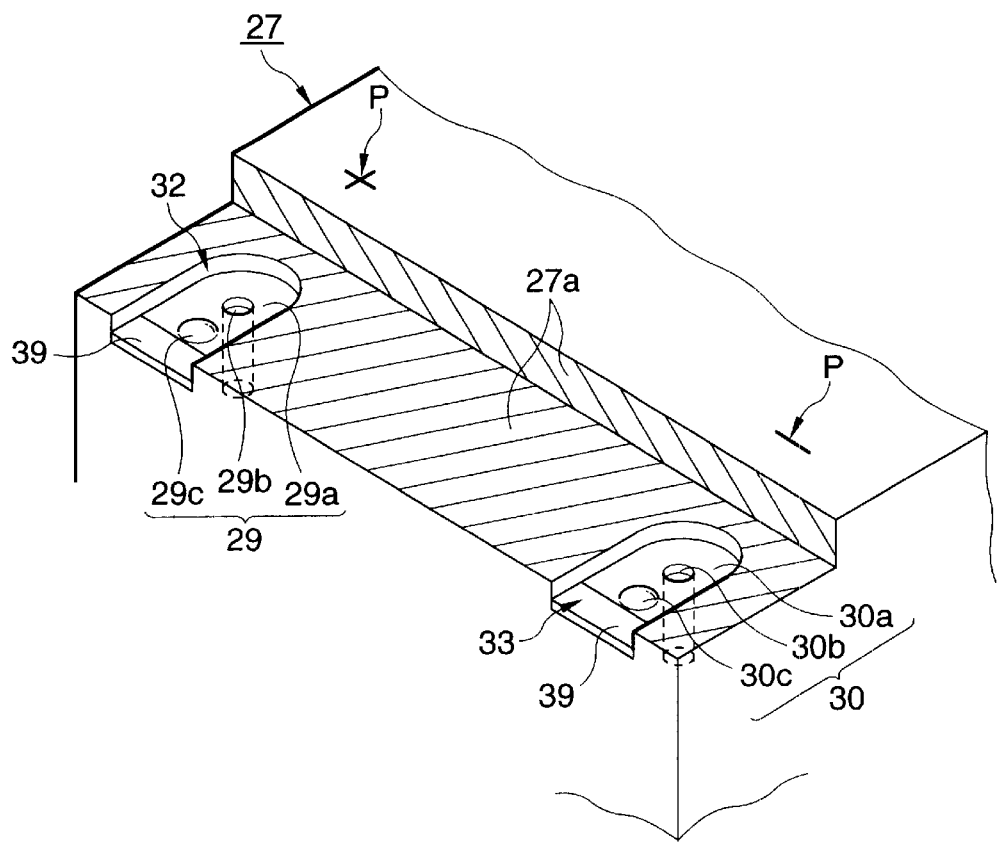
FIG. 2 is a partially broken perspective view of a primary part of the battery body shown in FIG. 1.
Figure 3:
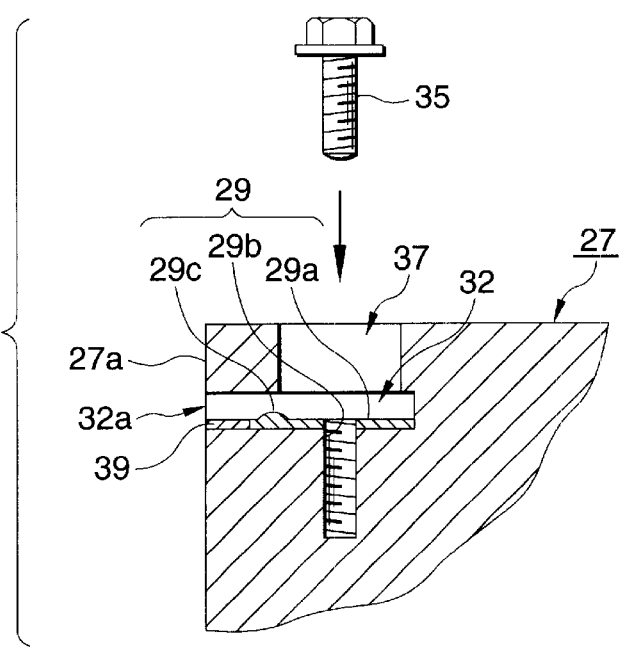
FIG. 3 is a sectional view taken along line III—III of FIG. 1.

FIG. 1 is a perspective view illustrating the entire battery body having a connecting structure for battery terminals according to a first embodiment of the invention. FIG. 2 is a perspective view illustrating a primary part of the battery body shown in FIG. 1. FIG. 3 is a sectional view taken along line III—III of FIG. 1.

As shown in FIG. 1, the connecting structure for battery terminals is adapted to establish the electrical connection between the battery terminals and the battery electrodes by fastening and fixing each of battery terminals 24 and 25 to one of battery electrodes 29, 30 by using a bolt 35 serving as a screw member. The battery electrodes 24 and 25 respectively correspond to the positive polarity and the negative polarity and are connected to the end portions of the wires 21 and 22. Each of the battery electrodes 29, 30 is of corresponding polarity.

The battery 27 has two accommodation spaces 32, 33 surrounded by an insulating wall portion 27a of the outer wall thereof. Further, a positive battery electrode 29 is provided in the accommodation space 32. Moreover, a negative battery electrode 30 is provided in the accommodation space 33. The accommodation spaces 32 and 33 are formed in a flat spaces corresponding to the shapes of the connecting flat plate portions 24a and 25a of the battery terminals 24 and 25.

Further, terminal insertion openings 32a, 33a respectively communicating with the accommodation spaces 32, 33 are opened in the upper left-side portion and the upper right-side portion of the battery body 27, respectively.

Moreover, working openings 37 respectively communicate with the accommodation spaces 32, 33 and enable an operation of screwing bolts 35 for fastening the battery terminals 24, 25 to the battery electrodes 29, 30, and are formed in the top surface portion of the battery body 27 in such a way as to penetrate therethrough.

As illustrated in FIGS. 2 and 3, each of the battery electrodes 29 and 30 is configured by a corresponding pedestal 29a or 30a made of an electrically conductive material forming the corresponding accommodation space 32 or 33, and a corresponding screw hole 29b or 30b and a corresponding latching projection 29c or 30c on the corresponding pedestal 20a or 30a. Incidentally, the pedestals 29a, 30a are each provided from the opening edges of the terminal insertion openings 21a, 33a to the rear side of the body 27. Circumferential portions of the opening edges of the inner bottom walls of the accommodation spaces 32, 33 as circumferential portions of the terminal insertion openings 32a, 33a, are formed from a insulating member 39, whose abrasion resistance is higher than the abrasion resistance of an insulating material of the insulating wall portion 27a.

The screw holes 29b and 30b recessed in the inner bottom wall of the accommodation spaces 32, 33 are used for fastening and fixing the battery terminals 24, 25 to the battery electrodes 29, 30 by the bolts 35 adapted to penetrate through the mounting holes 24b, 25b respectively formed in connecting flat plate portions 24a, 25a of the battery terminals 24, 25.

Further, the latch projections 29c and 30c projected from the inner bottom walls of the accommodation spaces 32, 33 serve as the temporary latch mechanism for temporary fixing the battery terminals 24, 25 respectively to the fixing positions (that is, the positions at which the mounting holes 24b, 25b are aligned with the screw holes 29b, 30b, to thereby enable the bolts 35 to fasten the terminals) by engaging the latch projection 29c and 30c respectively with the engaging holes 41, 42 formed in the connecting flat plate portions 24a, 25a.

Furthermore, the terminal insertion openings 32a, 33a each have a predetermined opening shape that enables only the battery terminals 24, 25, which respectively correspond to the positive battery electrode 29 and the negative battery electrode 30 provided in the accommodation spaces 32, 33, to be fitted thereinto. Moreover, the connecting flat plate potions 24a, 25a of the battery terminals 24, 25 each have a predetermined shape in a cross section, which enables only the connecting flat plate portions 24a, 25a to be fitted into the corresponding terminal insertion openings 32a, 33a.

That is, the terminal insertion opening 32a has an opening width a1, which is wider than that of the terminal insertion opening 33a, and also has an opening height b1, which is lower than that of the terminal insertion height d1 of the terminal insertion opening 33a.

Further, the connecting flat plate portion 24a of the positive battery terminal 24 has a nearly rectangular section, whose plate width a2, which is wider than that c2 of the connecting flat plate portion 25a of the negative battery terminal 25, and plate thickness b2, which is thinner than that d2 of the connecting flat plate portion 25a of the negative battery terminal 25. These battery terminals 24, 25 have relatively simple forms, which differ from each other only in the plate width and the plate thickness. Thus, these battery terminals can easily be formed by press-molding. Consequently, the manufacturing cost thereof does not increase.

Incidentally, polarity marks P are provided on the top surfaces of the battery body 27, and the connecting flat plates 24a and 25a so that during the operations of connecting the battery terminals 24 and 25, the battery electrodes to be connected thereto can be checked by visual inspection.

Thus, according to the connecting structure for battery terminals of this embodiment, each of the battery terminals 24, 25 connected to the end portions of the wires 21, 22 is electrically connected to the battery electrode of the corresponding polarity by fastening and fixing each of the connecting flat plate portions 24a, 25a, which are fitted into the accommodation spaces 32, 33 from the corresponding terminal insertion openings 32a, 33a of the battery body 27, to one of the battery electrodes 29, 30, which is of the corresponding polarity, with bolts 35.

Even when, for example, the battery terminal 24 for the positive electrode is misfitted into the terminal insertion opening 33a corresponding to the polarity, which does not correspond to this battery terminal, (that is, the negative electrode) at that time, this battery terminal 24 interferes with the opening edge of the terminal insertion opening 33a because the plate width a2 of the connecting flat plate portion 24a is wider than the opening width c1 of the terminal insertion opening 33a. Consequently, this battery terminal 24 cannot be fitted into this terminal insertion opening 33a. Moreover, even the contact between this battery terminal 24 and the battery electrode 30 provided in the accommodation space 33 surrounded by the insulating wall portion 27a cannot be achieved.

Further, even when the battery terminal 25 for the negative electrode is misfitted into the terminal insertion opening 32a corresponding to the polarity, which does not correspond to this battery terminal 25 (that is, the positive electrode), this battery terminal 25 interferes with the opening edge of the terminal insertion opening 32a because the plate height d2 of the connecting flat plate portion 25a is wider than the opening height b1 of the terminal insertion opening 32a. Consequently, this battery terminal 25 cannot be fitted into this terminal insertion opening 32a. Moreover, even the contact between this battery terminal 25 and the positive battery electrode 29 provided in the accommodation space 32 surrounded by the insulating wall portion 27a cannot be achieved.

Thus, the misconnection is known without the contact between the battery terminal 24 (25) and the battery electrode 30 (29), which do not correspond to each other, and the connection therebetween. Therefore, the misconnection therebetween can be reliably prevented.

Consequently, there is no fear that electric backflow caused by the miscontact may break the equipment.

Further, because the battery electrodes 29 and 30 are provided in the accommodation spaces 32, 33 surrounded by the insulating wall portions 27a (including the insulating member 39) of the outer wall, arc caused at a moment, at which the battery terminals 24, 25 are in contact with each other, occurs in the accommodation space 32, 33. Thus, sparks due to the arc do not go out of the battery body 27.

Therefore, sparks generated owing to the arc at the time of connecting the battery terminal to the battery electrode can be reliably prevented from falling down the hands of the worker. Consequently, the reliability and safety of the structure can be enhanced.

Furthermore, when the battery terminals 24, 25 are fastened and fixed to the battery electrodes 29, 30, the battery terminals 24, 25 are temporarily latched at the fastening/fixing positions in the accommodation spaces 32, 33. Thus, one hand of a worker can be prevented from being used for supporting the battery terminal during an operation of fastening the battery terminal by the bolts 35. Consequently, the worker can easily perform the screwing operation by freely using both hands. Moreover, the number of working hours can be reduced.

Further, the circumferential portion of the opening edge of each of the accommodation spaces 32, 33 in this embodiment is formed from an insulating member 39, whose abrasion resistance is higher than abrasion resistance of the insulating material of the insulating wall 27a. This prevents the circumferential portions, which are rubbed when the battery terminals 24, 25 are inserted into or detached from the accommodation spaces 32, 33, of each of the terminal insertion openings 32a, 33a from wearing down and eroding during the attachment/detachment of the battery terminals 24, 25. Additionally, this prevents the opening shapes of the terminal insertion openings 23a, 33a from being deformed.

Incidentally, the configurations of the battery terminals, the battery electrodes, the screw members, the terminal insertion openings, and the temporary latch mechanism in the connecting structure for battery terminals of the invention are not limited to those of the aforementioned embodiment. Needless to say, various modifications may be made according to the gist of the invention.

For instance, the temporary latch mechanism, by which the battery terminal is temporarily latched at the fastening/fixing position, may be configured by being adapted to engage an engaging claw, which is provided at the tip of the connecting flat plate portion for connecting the battery terminal, with a latch portion provided on the inner bottom wall of the accommodation space. Therefore, various configurations may be employed.

Further, although the pedestals 29a and 30a made of an electrically conductive material are provided in the battery electrodes 29, 30 of the first embodiment, and the battery terminals 24, 25 are fastened and fixed thereto by the bolts 35 serving as screw members, the invention is not limited thereto.

Figure 4:
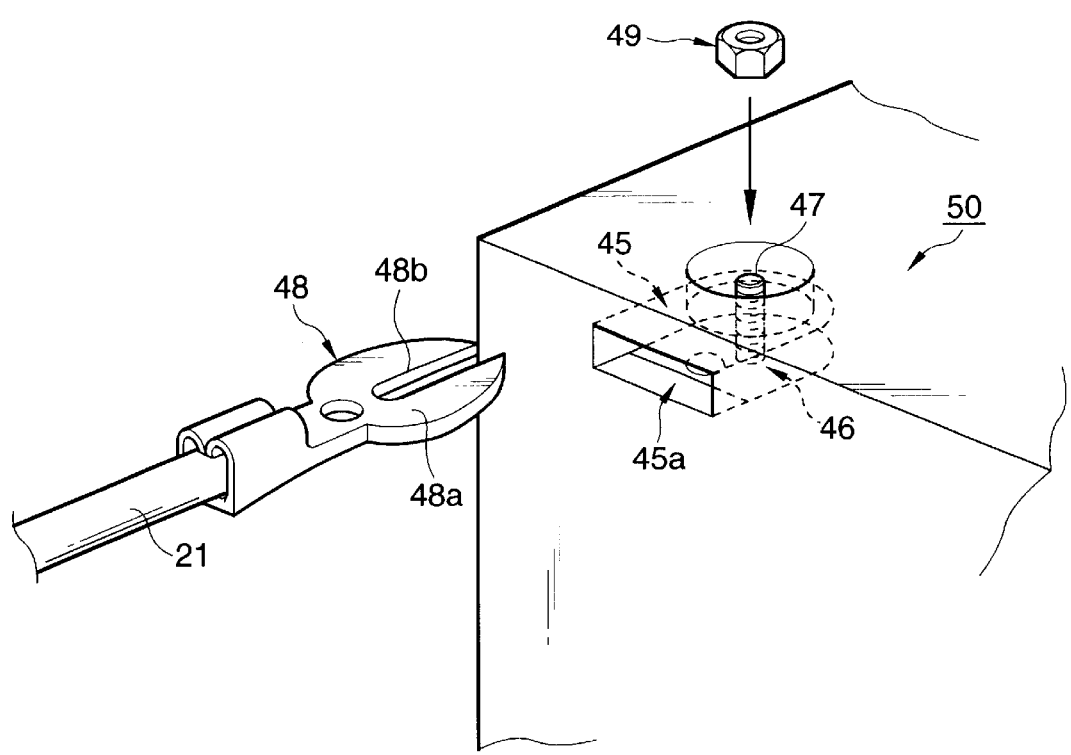
FIG. 4 is a perspective view illustrating a primary part of a battery body having a connecting structure for a battery terminal according to a second embodiment of the invention.
Figure 5:
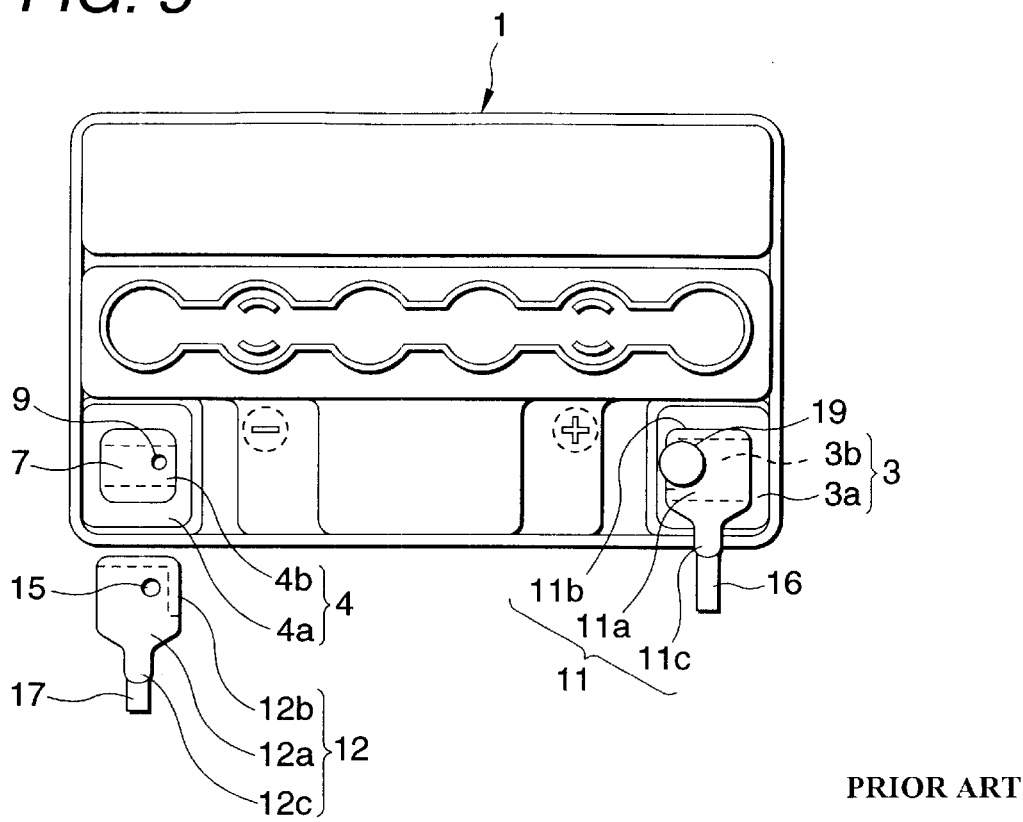
FIG. 5 is a plan view of a battery body having a related connecting structure for a battery terminal.
Figure 6:
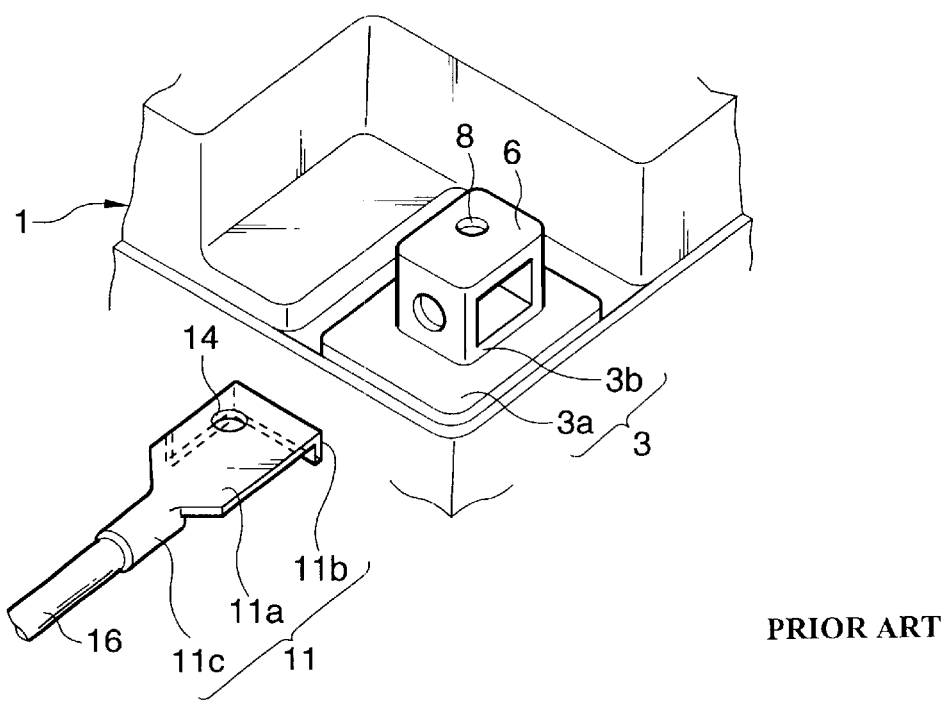
FIG. 6 is an enlarged perspective view illustrating the connecting structure for a battery terminal, which is shown in FIG. 5

FIG. 4 shows a connecting structure for battery terminals, which is a second embodiment of the invention, is constructed so that the battery electrode 46 provided in the accommodation space 45 of the battery body 50 comprises an electrode post 47 serving as a male screw member, which is provided in such a manner as to extend in a direction perpendicular to a pedestal made of an electrically conductive material.

Moreover, a notch 48a, through which the electrode post 47 penetrates, is formed in the connecting flat plate portion 48a of the battery terminal 48 connected to the end portion of the wire 21.

Thus, the battery terminal 48 is electrically connected to the battery electrode 46 of the corresponding polarity by fastening and fixing the connecting flat plate portion 48a, which is fitted into the accommodation space 45 from the corresponding terminal insertion opening 45a of the battery body 5, to the electrode 46 with a nut 49 serving as a screw member.

What is claimed is:

1. A connecting structure for battery terminals comprising:
    a battery body including first and a second accommodations formed of insulating material;
    a first electrode provided in the first accommodation;
    a second electrode provided in the second accommodation;
    a first terminal insertion opening provided in the first accommodation for link the first accommodation to outside of the battery body;
    a second terminal insertion opening provided in the second accommodation for link the second accommodation to the outside of the battery body;
    a first battery terminal which is connected to a wire and includes a first connecting flat plate portion insertable to the first terminal insertion opening for electrical connection to the first electrode; and
    a second battery terminal which is connected to a wire and includes a second connecting flat plate portion insertable to the second terminal insertion opening for electrical connection to the second electrode,
    wherein the first terminal insertion opening has an opening width wider than an opening width of the second terminal insertion opening, and has an opening height lower than an opening height of the second terminal insertion opening, thereby the first connecting flat plate is not insertable to the second terminal insertion opening, and the second connecting flat plate is not insertable to the first terminal insertion plate.

2. The connecting structure for the battery terminals according to claim 1, wherein temporary latch members is provided on the first and second accommodations and the first and second battery terminals for temporary fixing each of the first and second battery terminals at a fixing position in each of the first and second accommodations.

3. The connecting structure for the battery terminals according to claim 2, wherein the temporary latch members includes latch projections respectively provided on the first and second accommodations and mounting holes which are respectively provided on the first and second battery terminal and engaged with the corresponding first and second latch projections.

4. The connecting structure for the battery terminals according to claim 1, wherein a circumferential portion of each of the first and second terminal insertion openings is formed from an insulating member, whose abrasion resistance is higher than abrasion resistance of an insulating material of an outer wall of the battery body.

5. The connecting structure for the battery terminals according to claim 1, wherein one of the first and second electrodes is positive and the other of the first and second electrodes is negative.

* * * * *